Patented July 23, 1946

2,404,706

UNITED STATES PATENT OFFICE 2,404,706

FLUORINATION

Jesse Harmon, Wilmington, Del., assignor to E. I. du Pont de Nemours & Company, Wilmington, Del., a corporation of Delaware No Drawing. Application October 4, 1943, Serial No. 504,951

5 Claims. (Cl. 260—653)

This invention relates to the fluorination of selected organic halogenated compounds, and more particularly to the fluorination of unsaturated organic compounds by means of an organic fluorinating agent.

Previous to the present invention, practically the only method for preparing fluorine-containing organic compounds has been to replace chlorine with fluorine by means of various inorganic reagents such as metallic fluorides including silver fluoride, antimony fluorides and mercuric fluoride in the presence or absence of hydrogen fluoride. Such inorganic reagents are hazardous and expensive, and their use is very restricted in application.

I have now discovered a process whereby trihalomethyl ethylenic compounds may be fluorinated readily to provide fluorine-containing trihalomethyl ethylenic compounds.

Accordingly, this invention has as an object a new method of producing fluorine-containing organic compounds. A further object is a safe, flexible, practicable and economical method for producing fluorinated organic compounds. A still further object is the employment as fluorinating agents of readily and commercially available fluorine compounds. A still further object is the provision of a process which proceeds smoothly and easily without undesirable side reactions. Additional objects will become apparent from an examination of the following description and claims.

These and other objects and advantages are accomplished by the herein described invention which broadly comprises heating a trihalomethyl ethylenic compound, i. e., a compound containing a group having the general formula

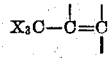

wherein the X substituents are halogens, and at least one of the X substituents is a halogen having an atomic weight of greater than 30, with a fluorinated methane in the presence of a Friedel-Crafts type catalyst.

In a more restricted sense this invention comprises heating at a temperature within the range of from about 100° C. to about 200° C. a compound having the general formula $X_3C-CY=CY_2$ wherein the X substituents are halogens, at least one of the X substituents having an atomic weight of greater than 30, and the Y substituents are monovalent radicals selected from the group consisting of hydrogen, halogens and monovalent alkyl radicals, at least one of the Y substituents being a halogen, with a fluorinated methane in the presence of from about 0.1% to about 20% by weight of the reacting materials of a Friedel-Crafts type catalyst which is a chloride of a polyvalent metal cation.

A preferred embodiment of this invention comprises heating hexachloropropylene with chlorodifluoromethane at a temperature within the range of from about 100° C. to about 200° C. in the presence of an amount of anhydrous aluminum chloride, calculated on the basis of the sum of the weights of the hexachloropropylene and chlorodifluoromethane, within the range of from 0.1% to 20%.

By the expression "trihalomethyl ethylenic compound" as used herein and in the appended claims is meant an organic compound containing the grouping

wherein the X substituents are halogen atoms and the double bond is a linkage in an aliphatic chain or in an alicyclic ring.

The method for carrying out the reaction varies to some extent with different types of trihalomethyl ethylenic compounds, but the usual procedure consists in placing a given amount of trihalomethyl ethylenic compound such as hexachloropropylene in a silver-lined autoclave with chlorodifluoromethane and a small amount of anhydrous aluminum chloride catalyst, and then heating the reaction mixture at about 100 to 200° C. with agitation for several hours.

The following examples, in which proportions are given in parts by weight unless otherwise specified, are given for illustrative purposes and are not intended to place any restrictions or limitations on the herein described invention:

Example I

A silver-lined high pressure reaction tube was charged with 15 parts of anhydrous aluminum chloride, 100 parts of hexachloropropylene and 150 parts of chlorodifluoromethane. The reactor was agitated and heated at 150° C. for 10 hours, then at 200° C. for 2 hours. After cooling and releasing the pressure, the liquid-solid reaction mixture was treated with water and the liquid was separated by decantation. The organic layer was washed with dilute aqueous sodium hydroxide solution, then water, and was dried and fractionally distilled through a precision still when there were isolated: 68 parts $CHCl_3$, B.P. 60–62° C., $N_D^{19}$ 1.4448; 41.3 parts $CF_3$—$CCl$=$CCl_2$, B.P. 86–88° C., $N_D^{20}$ 1.4103; and 4 parts $CF_2Cl$—$CCl$=$CCl_2$, B.P. 128° C.

*Example II*

On repeating Example I at 100° C. there were isolated:

| Compound | Parts by weight | Boiling range, °C. | $N_D^{20}$ |
|---|---|---|---|
| $CHCl_3$ | 58 | 60–61.5 | 1.4390 |
| $CF_3$—$CCl$=$CCl_2$ | 8 | 87 | 1.4094 |
| $CF_2Cl$—$CCl$=$CCl_2$ | 3.5 | 25/15 mm | 1.4596 |
| $CFCl_2$—$CCl$=$CCl_2$ | 4.5 | 53–55/15 mm | 1.5015 |
| $CCl_3$—$CCl$=$CCl_2$ | 67 | 35–36/2 mm | 1.5490 |

As hereinbefore stated, my novel process comprises fluorinating a trihalomethyl ethylenic compound wherein at least one of the three halogens in the trihalomethyl group has an atomic weight of greater than 30, with a fluorinated methane in the presence of a Friedel-Crafts type catalyst. The resultant fluorinated products contain a group having the general formula

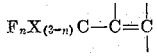

wherein $n$ is a positive integer within the range of from 1 to 3 and the X substituents are halogens having an atomic weight of greater than 30.

It is to be understood that any trihalomethyl ethylenic compound in which at least one of the three halogens in the trihalomethyl group has an atomic weight of greater than 30 may be fluorinated according to my novel process. However, on account of the greater ease with which the reaction proceeds therewith, the preferred trihalomethyl ethylene compounds are compounds selected from the group of compounds having the general formula $X_3C$—$CY$=$CY_2$, wherein the X substituents are halogens of which at least one is a halogen having an atomic weight of greater than 30 and the Y substituents are monovalent radicals selected from the group consisting of hydrogen, halogens and monovalent hydrocarbon radicals. Examples of monovalent hydrocarbon radicals represented by Y in the above formula are: methyl, ethyl, isobutyl, amyl, hexyl and cyclohexyl radicals.

It is to be understood that the trihalomethyl ethylenic compounds fluorinated by the process of this invention contain the group

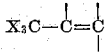

wherein the X substituents are halogens, at least one of which is a halogen having an atomic weight of greater than 30. Examples of said group are:

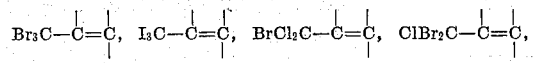

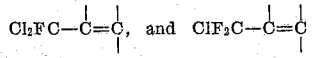

In addition to hexachloropropylene disclosed in Examples I and II, trihalomethyl ethylenic compounds which may be fluorinated by the process of this invention include: $ClF_2C$—$CCl$=$CF_2$,

and 

Trihalomethyl ethylenic compounds in which the ethylenic double bond is present in a cycloaliphatic ring as in cyclohexene may also be used.

The trihalomethyl ethylenic compounds having one or more halogen atoms connected directly to the carbon atoms bearing the double bond are preferred since they are more stable and their trihalomethyl groups are more readily fluorinated. Optimum results are had when the trihalomethyl ethylenic compound subjected to fluorination in accordance with this invention has the general formula $X_3C$—$CY$=$CY_2$ wherein the X substituents are halogens of which at least one is a halogen having an atomic weight of greater than 30, the Y substituents are monovalent radicals selected from the group consisting of hydrogen, halogens and monovalent hydrocarbon radicals, and at least one of the Y substituents is a halogen, and particularly when the trihalomethyl ethylenic compound contains not more than 10 carbon atoms.

The present process is broadly applicable to fluorinated methanes and particular significance is attached to the use of the commercially available fluorinated methanes. Included among said fluorinated methanes are dichlorofluoromethane, dichlorodifluoromethane, chlorofluoromethane, chlorodifluoromethane, bromodifluoromethane, difluoromethane, chlorotrifluoromethane, fluorotrichloromethane, trifluoromethane and tetrafluoromethane.

The catalysts employed in the present process are Friedel-Crafts type catalysts which are chlorides or bromides of polyvalent metal cations, and include such salts as aluminum chloride, aluminum bromide, ferric chloride, zinc chloride, stannic chloride and the like. The proportion of catalyst employed may vary within relatively wide limits depending largely upon the nature of the reactants and the products desired. Generally speaking, desirable results are obtained with the use of small amounts of catalyst corresponding to from about 0.1% to 20% by weight of the materials used. Advantageous results are sometimes obtained by using a combination of catalysts. The time required for carrying out the reactions may vary from a few minutes to several days depending upon the nature of the reactants and the other operating conditions such as temperature, pressure and catalyst. In general it is preferable to carry out the reaction in the absence of water.

The process may be operated continuously or intermittently. Additional fluorinated methane may be added during the course of the reaction. The by-product halogenated methanes such as chloroform in the examples may be reconverted into fluoromethanes by well known commercial processes and recycled. The reaction may be carried out in a closed system in the liquid or vapor phase, or in the vapor phase by mixing the vapors of the trihalomethyl ethylenic compound and fluorinated methane and passing the mixture through a hot reaction tube containing the Friedel-Crafts type catalyst. The pressure at which the reaction is carried out is dictated by the vapor pressure and other properties of the reactants and products. Generally, however, it is carried out at superatmospheric pressures.

The temperature at which the reaction is effected may vary over a fairly wide range, depending largely upon the nature of the reactants, the catalyst, the results desired, and the other conditions of the reaction. However, it is necessary to carry out the reactions at an elevated temperature. Optimum yields are usually obtained at temperatures within the range of from about 100 to 200° C., but higher temperatures, below that at which decomposition of the reactants and/or products occurs, are sometimes desirable.

The reactions may be carried out in any suitable reaction vessel whose materials of construction are resistant to the action of the reactants and catalysts, and which are capable of withstanding heat and pressure, such as stainless steel, silver and the like. The reaction is preferably carried out with agitation, but agitation is not always necessary. The reaction and the separation or isolation of the products may be carried out simultaneously or in separate steps.

The fluorinated products prepared in accordance with this invention are trihalomethyl ethylenic compounds in which at least one of the three halogen atoms in the trihalomethyl group is a fluorine atom. Said products have the general formula $F_nX_{(3-n)}C-CY=CY_2$ in which formula $n$ is a positive integer within the range of from 1 to 3, the X substituents are halogens having an atomic weight of greater than 30 and the Y substituents are monovalent radicals selected from the group consisting of hydrogen, halogens and monovalent hydrocarbon radicals. It is to be understood that a mixture of fluorinated products in which $n$ is 1, 2 and 3 may be obtained upon fluorination of a given trihalomethyl ethylenic compound, e. g. a trichloromethyl ethylenic compound, but the compounds are usually easily separated into definite fractions by conventional methods such as fractional distillation. The relative proportions of the mono-, di- and trifluoromethyl ethylenic compounds obtained will depend upon the reactants and conditions.

By way of illustration, the fluorination of hexachloropropylene by chlorodifluoromethane in the presence of aluminum chloride is represented below:

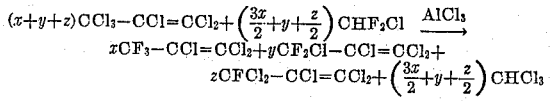

$$(x+y+z)CCl_3-CCl=CCl_2+\left(\frac{3x}{2}+y+\frac{z}{2}\right)CHF_2Cl \xrightarrow{AlCl_3}$$
$$xCF_3-CCl=CCl_2+yCF_2Cl-CCl=CCl_2+$$
$$zCFCl_2-CCl=CCl_2+\left(\frac{3x}{2}+y+\frac{z}{2}\right)CHCl_3$$

It is well known that the halogens in certain halogenated hydrocarbons can be replaced with fluorine by means of various inorganic fluorinating reagents. However, it is surprising that the extremely stable fluorinated methanes such as chlorodifluoromethane can be used as a source of fluorine for selectively fluorinating trihalomethyl ethylenic compounds without affecting the ethylenic group.

The present invention is particularly advantageous in that it affords a safe, flexible, practicable and economical process of fluorinating organic compounds of the character herein described. One of the advantages of said process is that fluorinated methanes which may be used in this invention are commercially available; and that said fluorinated methanes, such as chlorodifluoromethane, which are extremely stable, can be used as a source of fluorine for selectively fluorinating trihalomethyl ethylenic compounds without affecting the ethylenic group. Another advantage is that the process may be operated with a relatively small amount of expensive catalyst and that the reaction proceeds smoothly and easily without undesirable side reactions.

As many apparently widely different embodiments of this invention may be made without departing from the spirit and scope thereof, it is to be understood that I do not limit myself to the specific embodiments thereof except as defined in the appended claims.

Having described the present invention, the following is claimed as new and useful:

1. The process for preparing a compound having the general formula $F_nX_{(3-n)}C-CY=CY_2$ wherein $n$ is a positive integer within the range of from 1 to 3, the X substituents are halogens having an atomic weight of greater than 30 and the Y substituents are monovalent radicals selected from the group consisting of hydrogen, halogens and monovalent hydrocarbon radicals, at least one of the Y substituents being a halogen, which comprises heating a compound having the general formula $F_mX_{(3-m)}C-CY=CY_2$, wherein $m$ is a number smaller than $n$ selected from the group consisting of zero and positive integers less than 3, the X substituents are halogens having an atomic weight of greater than 30 and the Y substituents are monovalent radicals selected from the group consisting of hydrogen, halogens and monovalent hydrocarbon radicals, at least one of the Y substituents being a halogen, with a fluorinated methane in the presence of an anhydrous Friedel-Crafts type catalyst.

2. The process according to claim 1 wherein the heating is effected at a temperature within the range of from about 100° C. to about 200° C.

3. The process for preparing a compound having the general formula $F_nX_{(3-n)}C-CY=CY_2$ wherein $n$ is a positive integer within the range of from 1 to 3, the X substituents are halogens having an atomic weight of greater than 30 and the Y substituents are halogens, which comprises heating a compound having the general formula $F_mX_{(3-m)}C-CY=CY_2$, wherein $m$ is a number smaller than $n$ selected from the group consisting of zero and positive integers less than 3, the X substituents are halogens having an atomic weight of greater than 30 and the Y substituents are halogens, with a fluoromethane in the presence of an anhydrous Friedel-Crafts type catalyst which is a chloride of a polyvalent metal cation.

4. The process for preparing a compound having the general formula $F_nX_{(3-n)}C-CY=CY_2$ wherein $n$ is a positive integer within the range of from 1 to 3, the X substituents are halogens having an atomic weight of greater than 30 and the Y substituents are halogens, which comprises heating a compound having the general formula $F_mX_{(3-m)}C-CY=CY_2$, wherein $m$ is a number smaller than $n$ selected from the group consisting of zero and positive integers less than 3, the X substituents are halogens having an atomic weight of greater than 30 and the Y substituents are halogens, with chlorodifluoromethane in the presence of anhydrous aluminum chloride.

5. The process for preparing a compound having the general formula $F_nCl_{(3-n)}C-CCl=CCl_2$ wherein $n$ is a positive integer within the range of from 1 to 3, which comprises heating hexachloropropylene with chlorodifluoromethane in the presence of anhydrous aluminum chloride at a temperature within the range of from about 100° C. to 200° C. and thereafter recovering the compound $F_nCl_{(3-n)}C-CCl=CCl_2$ by distillation.

JESSE HARMON.